(12) United States Patent
Hu et al.

(10) Patent No.: US 11,671,003 B2
(45) Date of Patent: Jun. 6, 2023

(54) MULTI-PHASE CONTROL CIRCUIT, MULTI-PHASE POWER SYSTEM AND TEMPERATURE BALANCE CONTROL METHOD THEREOF

(71) Applicant: Shanghai Bright Power Semiconductor Co., Ltd., Shanghai (CN)

(72) Inventors: Li-Qiang Hu, Shanghai (CN); Shun-Gen Sun, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/521,075

(22) Filed: Nov. 8, 2021

(65) Prior Publication Data
US 2022/0149718 A1    May 12, 2022

(30) Foreign Application Priority Data
Nov. 9, 2020 (CN) .......................... 202011239342.0

(51) Int. Cl.
| | | |
|---|---|---|
| H02M 1/32 | (2007.01) | |
| G05F 1/567 | (2006.01) | |
| H02M 3/158 | (2006.01) | |
| H02M 3/04 | (2006.01) | |

(52) U.S. Cl.
CPC ............. *H02M 1/327* (2021.05); *H02M 3/04* (2013.01); *G05F 1/567* (2013.01); *H02M 3/1584* (2013.01)

(58) Field of Classification Search
CPC ...... G05F 1/567; H02M 1/327; H02M 3/1584
See application file for complete search history.

(56) References Cited

U.S. PATENT DOCUMENTS

| | | | |
|---|---|---|---|
| 10,432,088 B1* | 10/2019 | Chang ................... | H02M 3/157 |
| 2014/0197810 A1* | 7/2014 | Huang .................... | G05F 1/468 |
| | | | 323/272 |
| 2014/0333273 A1* | 11/2014 | Chang ................. | H02M 3/1584 |
| | | | 323/272 |
| 2015/0002126 A1* | 1/2015 | Ouyang ............. | H02M 3/1584 |
| | | | 323/304 |
| 2015/0248135 A1* | 9/2015 | Han ........................ | G05F 1/462 |
| | | | 307/31 |
| 2018/0278162 A1* | 9/2018 | Petricek ............. | H02M 3/1584 |

FOREIGN PATENT DOCUMENTS

TW            201603429 A    *   1/2016

* cited by examiner

*Primary Examiner* — Gary A Nash
(74) *Attorney, Agent, or Firm* — Muncy, Geissler, Olds & Lowe, P.C.

(57) ABSTRACT

A multi-phase control circuit and a temperature balance control method thereof The temperature balance control method of the multi-phase control circuit includes the steps of: acquiring a first temperature signal reflecting a representative temperature among a plurality of power stages, then acquiring a plurality of second temperature signals reflecting a respective temperature of each of the plurality of power stages; and adjusting a pulse width and/or frequency of a pulse width modulation signal of at least one of the plurality of power stages according to a comparison result between the first temperature signal and the second temperature signal so as to balance the temperatures of the plurality of power stages.

18 Claims, 4 Drawing Sheets

MULTI-PHASE CONTROL CIRCUIT, MULTI-PHASE POWER SYSTEM AND TEMPERATURE BALANCE CONTROL METHOD THEREOF

FIELD OF THE INVENTION

The disclosure relates to a multi-phase control circuit and method, in particular to a circuit and method for balancing the temperature of a multi-phase voltage regulator.

BACKGROUND OF THE INVENTION

As semiconductor technology continues to evolve, for example, computers and peripheral digital products have become increasingly newer. In the application integrated circuits of computers and peripheral digital products, due to the rapid development of semiconductor technology, more diversified requirements of integrated circuit power supply are caused. Voltage regulators of various combinations, such as boost converter, buck converter and so on, are used to achieve different power supply requirements of various integrated circuits, and also become one of the important factors whether various diversified digital products can be provided.

In various voltage regulation circuits, multi-phase voltage regulators have good performance in high current or high power applications. However, due to the inconsistency of the layout and design of the multi-phase power supply, the temperature inconsistency of each phase is caused, that is, the conditions that sonic phases are low in temperature and sonic phases are high in temperature exist, so that the reliability of the multi-phase power supply is reduced and the power output capacity of the multi-phase power supply is limited. Therefore, temperature control of a multi-phase voltage regulator is an urgent problem to be solved.

SUMMARY OF THE INVENTION

The disclosure provides a circuit and method for balancing the temperature of a multi-phase voltage regulator, which can effectively achieve temperature balance.

The disclosure further provides a multi-phase voltage regulator which can effectively achieve temperature balance.

Other objects and advantages of the present disclosure can be further understood from the technical features disclosed herein.

The present disclosure relates to a multi-phase control circuit configured to control a plurality of power stages operating in different phases. The multi-phase control circuit comprises a plurality of control modules for controlling the plurality of power stages. The at least one of the control modules acquires a first temperature signal indicating a representative temperature among the plurality of power stages and a second temperature signal indicating a respective temperature thereof. And the at least one of the control modules adjusts a pulse width and/or frequency of a pulse width modulation signal of the power stage according to a comparison result between the first temperature signal and the second temperature signal so as to balance the temperatures of the plurality of power stages.

The present disclosure also relates to a multi-phase control circuit configured to control a plurality of power stages operating in different phases. The multi-phase control circuit comprises a control module for controlling the plurality of power stages. The control module acquires a first temperature signal indicating a representative temperature among the plurality of power stages and a plurality of second temperature signals indicating to a plurality of respective temperatures of the plurality of power stages. The control module adjusts a pulse width and/or frequency of a pulse width modulation signal of at least one of the plurality of power stages according to a comparison result between the first temperature signal and the second temperature signal so as to balance the temperatures of the plurality of power stages.

The present disclosure further relates a multi-phase power system comprising a plurality of power processing circuits and a multi-phase control circuit. The multi-phase control circuit comprises a plurality of control modules for controlling the plurality of power stages. At least one of the control module acquires a first temperature signal indicating a representative temperature among the plurality of power stages and a second temperature signal indicating a respective temperature thereof. The at least one of the control modules adjusts a pulse width and/or frequency of a pulse width modulation signal of the power stage according to a comparison result between the first temperature signal and the second temperature signal so as to balance the temperatures of the plurality of power stages.

The present disclosure further relates to a temperature balance method of a multi-phase control circuit. Firstly, a first temperature signal indicating a representative temperature among a plurality of power stages is acquired. Then, a plurality of second temperature signals indicating a plurality of respective temperatures of each of the plurality of power stages are acquired. Subsequently, a pulse width and/or frequency of a pulse width modulation signal of at least one of the plurality of power stages is adjusted according to a comparison result between the first temperature signal and the second temperature signal so as to balance the temperatures of the plurality of power stages.

Accordingly, the temperature differences between the plurality of power stages operating in different phases could be easily obtained by comparing the first temperature signal and the second temperature signal. Then, one or some of the pulse width modulation signals for controlling the plurality of power stages may be adjusted individually to compensate the temperature differences between the plurality of power stages. As such, the temperature differences could be minimized and temperature equalization of the multi-phase voltage regulator can be effectively achieved. The reliability of the multi-phase voltage regulator is greatly improved. By utilizing the circuit and method of the present disclosure, the multi-phase voltage regulator can fully utilize the power output capability of the multi-phase power supply and simultaneously improve the reliability of the multi-phase power supply.

DETAILED DESCRIPTION OF THE PREFERRED EMBODIMENTS

The foregoing and other technical contents, features and effects of the disclosure will be apparent from the following detailed description of a preferred embodiment, taken in conjunction with the accompanying drawings.

When an element is referred to as being "connected" or "coupled" to another element, the element may be connected or coupled to the other element directly or through intervening elements. Additionally, it should be understood that the order of description of the various embodiments should not be construed to imply that the operations or steps must be order dependent, and that alternative embodiments may perform the steps, operations, methods, etc. in an order other than that described herein.

The present disclosure relates to a multi-phase control circuit for controlling a plurality of power stages operating in different phases. According to different embodiments, the multi-phase control circuit may includes a plurality of control units or a single controller.

The present disclosure relates to a multi-phase control circuit for controlling a plurality of power stages operating in different phases. According to different embodiments, the multi-phase control circuit may include a plurality of control modules or a single control module. Alternatively, in some embodiments, the multi-phase control circuit may include a plurality of control modules combined with a plurality of temperature sampling units or a single control module combined with a plurality of temperature sampling units.

While in certain embodiments, a multi-phase power system is disclosed, which includes a plurality of power processing circuits and a multi-phase control circuit. in the embodiments disclosed below, the control module may refer to a pulse width modulation adjustment circuit. The details of the control module, and the temperature sampling units will be described below.

Figure 1:
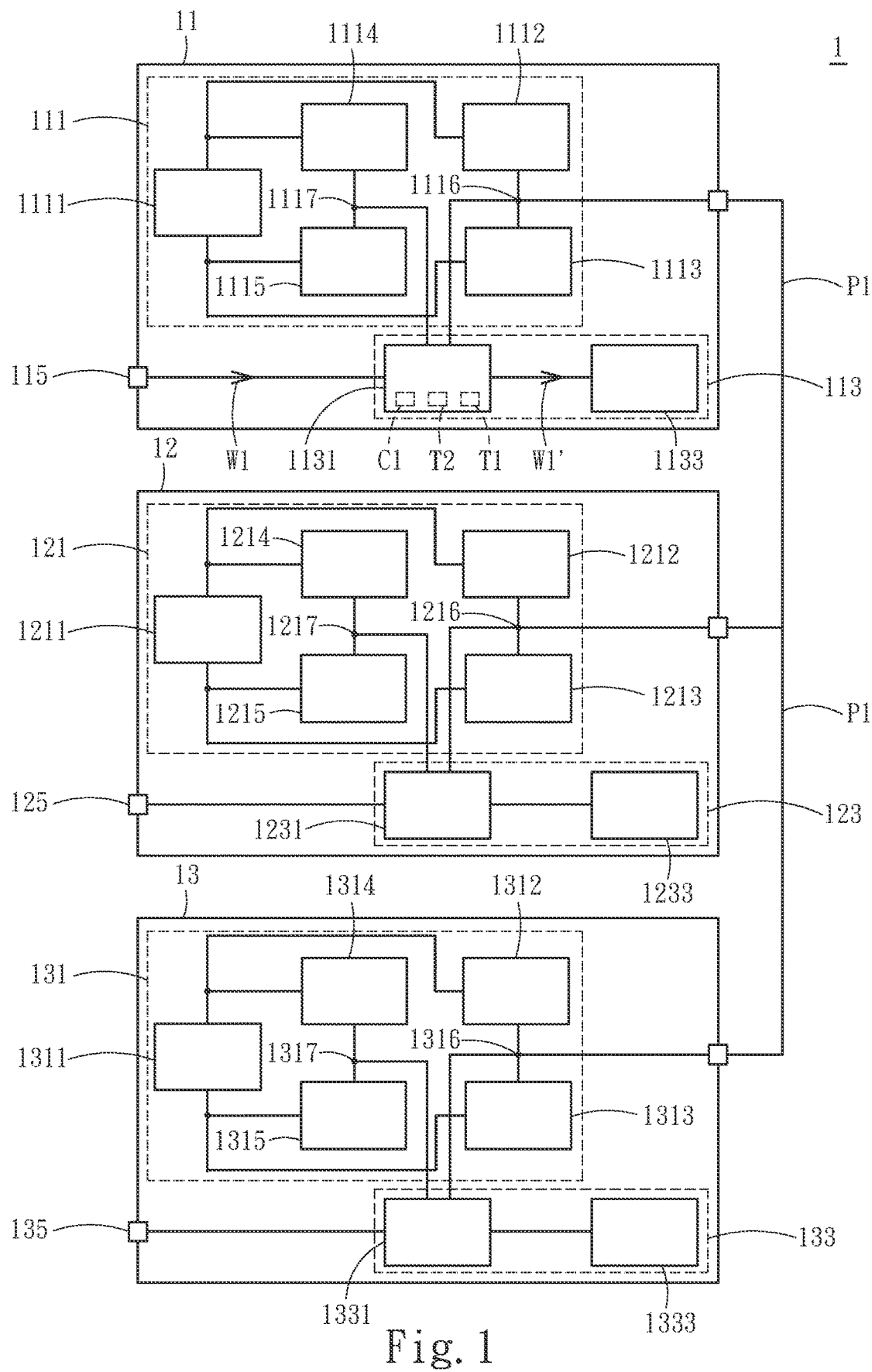
FIG. 1 is a schematic diagram of a multi-phase voltage regulator according to an embodiment of the present disclosure.

FIG. 1 is a schematic diagram of a multi-phase voltage regulator 1 according to an embodiment of the present disclosure. In the embodiment, the multi-phase control circuit is applied to the multi-phase voltage regulator 1 as shown in FIG. 1. The multi-phase voltage regulator 1 includes a plurality of power stages 11, 12, 13, The disclosure is not limited regarding the number of power stages included in the multi-phase voltage regulator. This embodiment illustrates that the multi-phase voltage regulator 1 includes three power stages 11, 12, 13. Each of the plurality of power stages 11, 12, 13 operates at different phases such that temperature of each of the plurality of power stages 11, 12. 13 may be different. A plurality of temperature sampling units 111, 121, 131 and a plurality of control units 113, 123, 133 are arranged in the plurality of power stages 11, 12, 13, respectively. The temperature sampling units 111, 121, 131 are connected in parallel with each other to form a parallel circuit P1. Furthermore, a plurality of pulse width modulation adjustment circuits 1131, 1231, 1331 and a plurality of power processing circuits 1133, 1233, 1333 are arranged in the plurality of control units 113, 123, 133, respectively.

In the present embodiment, the power stage 11 is described for convenience of description, and the plurality of power stages 12, 13 have the same structure and function as the power stage 11. The pulse width modulation adjustment circuits 1131 in the power stage 11 acquires a first temperature signal T1. The first temperature signal T1 is a signal that indicates a representative temperature among the plurality of power stages 11, 12, 13. In the embodiment, the representative temperature is a highest temperature among the plurality of power stages 11, 12, 13. For example, if the temperature of the power stages 13 is higher than that of power stages 11, 12, the first temperature signal T1 acquired by the control unit 113 of the power stage 11 will indicate the temperature of the power stages 13 (the highest temperature). Similarly, the pulse width modulation adjustment circuits 1231, 1331 of the power stages 12, 13 will acquire the first temperature signal T1 as well as the pulse width modulation adjustment circuits 1131 in the power stage 11. In other embodiment, the representative temperature maybe a lowest temperature among the plurality of power stages 11, 12, 13 or other specific temperature among the plurality of power stages 11, 12, 13.

Furthermore, each of the plurality of the pulse width modulation adjustment circuits 1133, 1233, 1333 acquires a second temperature signal T2 from the temperature sampling units 111, 121, 131, respectively. The second temperature signal T2 indicates a respective temperature of each of the plurality of power stages 11, 12, 13, respectively. In the embodiment, the respective temperature means a temperature of one of the plurality of power stages 11, 12, 13.

For the multi-phase voltage regulator 1, the first temperature signal T1 acquired by each of the pulse width modulation adjustment circuits 1133, 1233, 1333 is the same. The second temperature signal T2 acquired by each of the pulse width modulation adjustment circuits 1133, 1233, 1333 is the different. Namely, there is only one representative temperature in the multi-phase voltage regulator 1, and there are multiple respective temperatures (due to the plurality of power stages operated under different temperatures) in the multi-phase voltage regulator 1.

The pulse width modulation adjustment circuits 1133 in the power stage 11 adjusts a pulse width modulation signal (PWM signal) of the power stage 11 according to a comparison result C1 between the first temperature signal T1 and the second temperature signal T2, wherein W1 is an unadjusted pulse width modulation signal and W1' is an adjusted pulse width modulation signal for purpose of balancing the temperatures among the plurality of power stages 11, 12, 13, The plurality of power stages 11, 12, 13 can effectively achieve temperature equalization, and the reliability of the multi-phase voltage regulator 1 is greatly improved.

In an embodiment of the disclosure, an adjustment amplitude of the pulse width and/or frequency of the adjusted pulse width modulation signal W1' of the power stage 11 of an operating phase is positively correlated with the comparison results C1. Namely, the larger the difference (the comparison results C1) between the first temperature signal T1 and the second temperature signal T2 (means larger temperature difference), the larger the increased amplitude of the adjusted pulse width modulation signal W1'. The smaller the difference between the first temperature signal T1 and the second temperature signal T2 (means lower temperature difference), the smaller the increased amplitude in the adjusted pulse width modulation signal W1'. In other words, the increased amplitude of the adjusted pulse width modulation signal W1' is associated with the comparison result C1. in one embodiment, the comparison result C1 directly represents a temperature difference between the temperature of the power stage 11 and the highest temperature.

Further exemplified by the power stage 11 having a higher temperature than the power stage 12 and the power stage 12 having a higher temperature than the power stage 13, the first temperature signal T1 reflects the temperature of the power stage 11, i.e. a highest temperature among the plurality of power stages 11, 12, 13, While the temperature of the power stage 11 is equal to the highest temperature (the comparison result C1 between the first temperature signal T1 and the second temperature signal T2 is zero), there is a first difference between the temperature of the power stage 12 and the highest temperature (the comparison result between the first temperature signal T1 and the second temperature signal T2 reflects the first difference), there is a second difference between the temperature of the power stage 13 and the highest temperature (the comparison result between the first temperature signal T1 and the second temperature signal T2 reflects the second difference), the second difference is larger than the first difference, and the pulse width modulation signal W1 of the power stage 11 is not adjusted according to the comparison result C1. On the other hand, the pulse width modulation signal W1 of the power stage 12 and the pulse width modulation signal of the power stage 13 are adjusted, wherein an adjustment amplitude of the pulse width modulation signal W1' of the power stage 13 is larger than that of the power stage 12. By the comparison results obtained for each of the plurality of power stages 11, 12, 13, the differences between the temperatures of each of the plurality of power stages 11, 12, 13 and the highest temperature can be obtained, whereby the temperature differences between each of the plurality of power stages 11, 12, 13 can be minimized by adjusting the pulse width modulation signal W1 for each of the plurality of power stages 11, 12, 13 accordingly.

In the present embodiment, the temperature sampling units 111, 121, 131 of the multi-phase voltage regulator 1 respectively include a temperature sampling circuit 1111, 1211, 1311, a first pull-up circuit 1112, 1212, 1312, a first pull-down circuit 1113, 1213, 1313, a second pull-up circuit 1114, 1214, 1314, and a second pull-down circuit 1115, 1215, 1315, respectively. The first pull-up circuit 1112, 1212, 1312, the first pull-down circuit 1113, 1213, 1313, the second pull-up circuit 1114, 1214, 1314, and the second pull-down circuit 1115, 1215, 1315 are coupled to the temperature sampling circuit 1111, 1211, 1311, respectively. A plurality of first sampling nodes 1116, 1216, 1316 are defined between the first pull-up circuits 1112, 1212, 1312 and the first pull-down circuits 1113, 1213, 1313, respectively. A plurality of second sampling nodes 1117, 1217, 1317 are defined between the second pull-up circuits 1114, 1214, 1314 and the second pull-down circuits 1115, 1215, 1315, respectively.

The temperature sampling units 111, 121, 131 are connected in parallel to each other via the first sampling nodes 1116, 1216, 1316 to acquire the temperatures of the plurality of power stages 11, 12, 13 to obtain a highest temperature (here indicated as the first temperature signal T1) among the plurality of power stages 11, 12, 13. It is understood that the first temperature signal T1 obtained by each of the temperature sampling units 111, 121, 131 is the same, The second sampling node 1117, 1217, 1317 is used for the control units 113, 123, 133 to acquire the temperatures of the respective power stages 11, 12, 13 (here denoted the second temperature signal T2). It is understood that the second temperature signal T2 obtained by the temperature sampling units 111, 121, 131 is different.

For ease of illustration, the power stage 11 is illustrated and the plurality of power stages 12, 13 have the same structure and function as the power stage 11. The first pull-up circuit 1112 and the second pull-up circuit 1114 are used for driving circuits inside the temperature sampling unit 111 to operate. The first pull-down circuit 1113 and the second pull-down circuit 1115 are used for driving circuits inside the temperature sampling unit 111 to operate. Thereby, the temperature sampling unit 111 can acquire the first temperature signal T1 through the first sampling node 1116, and the control unit 113 can acquire the second temperature signal T2 through the second sampling node 1117.

Figure 2A:
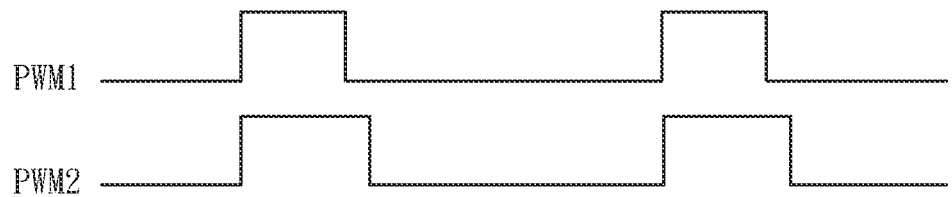
FIG. 2A is a schematic diagram of a pulse phase of a multi-phase voltage regulator according to an embodiment of the present disclosure.
Figure 2B:
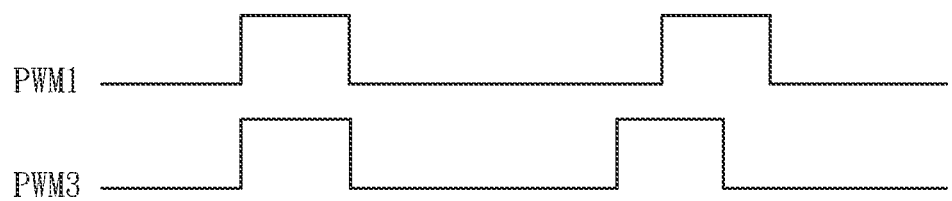
FIG. 2B is a schematic diagram of a pulse phase of a multi-phase voltage regulator according to an embodiment of the present disclosure.

The plurality of pulse width modulation adjustment circuits 1131, 1231, 1331 are configured for receiving the pulse width modulation signal W1 from a pulse width modulation input 115, 125, 135, respectively. The plurality of the control units 113, 123, 133 further comprise a plurality of power processing circuits 1133, 1233, 1333 which are coupled to the pulse width modulation adjustment circuit 1131, 1231, 133, respectively 1. For ease of illustration, the power stage 11 is illustrated and the plurality of power stages 12, 13 have the same structure and function as the power stage 11. In the power stage 11, the pulse width modulation adjustment circuit 1131 adjusts the pulse width modulation signal W1 and outputs the adjusted pulse width modulation signal W1' to the power processing circuit 1133 according to the pulse width modulation signal W1 input from the pulse width modulation input 115 and the comparison result C1. With reference to FIG. 2A and FIG. 2B, in the embodiment of FIG. 2A, PWM1 represents an unadjusted pulse width modulation signal (i.e., W1) and PWM2 represents an adjusted pulse width modulation signal (i.e., W1'), and in this embodiment, the pulse width modulation adjustment circuit 1131 adjusts (increases) the pulse width of the pulse width modulation signal W1. In the embodiment of FIG. 2B PWM1 represents an unadjusted pulse width modulation signal (i.e., W1) and PWM3 represents an adjusted pulse width modulation signal (i.e., W1'), and in this embodiment, the pulse width modulation adjustment circuit 1131 adjusts (increases) the frequency of the pulse width modulation signal W1.

In the present embodiment, the pulse width modulation signal of each of the plurality of power stages 11, 12, 13 is adjusted according to the comparison result of each of the plurality of power stages 11, 12, 13 to keep the temperature of each of the plurality of power stages 11, 12, 13 consistent and close to a predetermined value. The multi-phase voltage regulator 1 can effectively enable the plurality of power stages 11, 12, 13 to achieve temperature equalization, and the reliability of the multi-phase voltage regulator 1 is greatly improved.

In the present embodiment, the temperature sampling units 111, 121, 131 of the plurality of power stages 11, 12, 13 are connected in parallel with each other to form the parallel circuit P1. Each of the plurality of power stages 11, 12, 13 supplies the first temperature signal T1 as a reference signal and the plurality of second temperature signals (e.g. the second temperature signal T2) as sample signals to the pulse width modulation adjustment circuits 1131, 1231, 1331 to adjust the pulse width modulation signals W1 of the power processing circuits 1133, 1233, 1333 of each of the plurality of power stages 11, 12, 13. If the second temperature signal of the plurality of power stages 11, 12, 13 is lower than the first temperature signal T1, it is indicated that the second temperature signal of the plurality of power stages 11, 12, 13 is lower, the pulse width modulation signals (e.g., the adjusted pulse width modulation signal W1') of the plurality of power stages 11, 12, 13 may be appropriately increased by the pulse width modulation adjustment circuits 1131, 1231, 1331 to cause the plurality of power stages 11, 12, 13 takes more current, causing the temperature of the plurality of power stages 11, 12, 13 to rise gradually, eventually reaching consistency with the first temperature signal T1. The temperature of all the plurality of power stages 11, 12, 13 may tend to be consistent.

Figure 3:
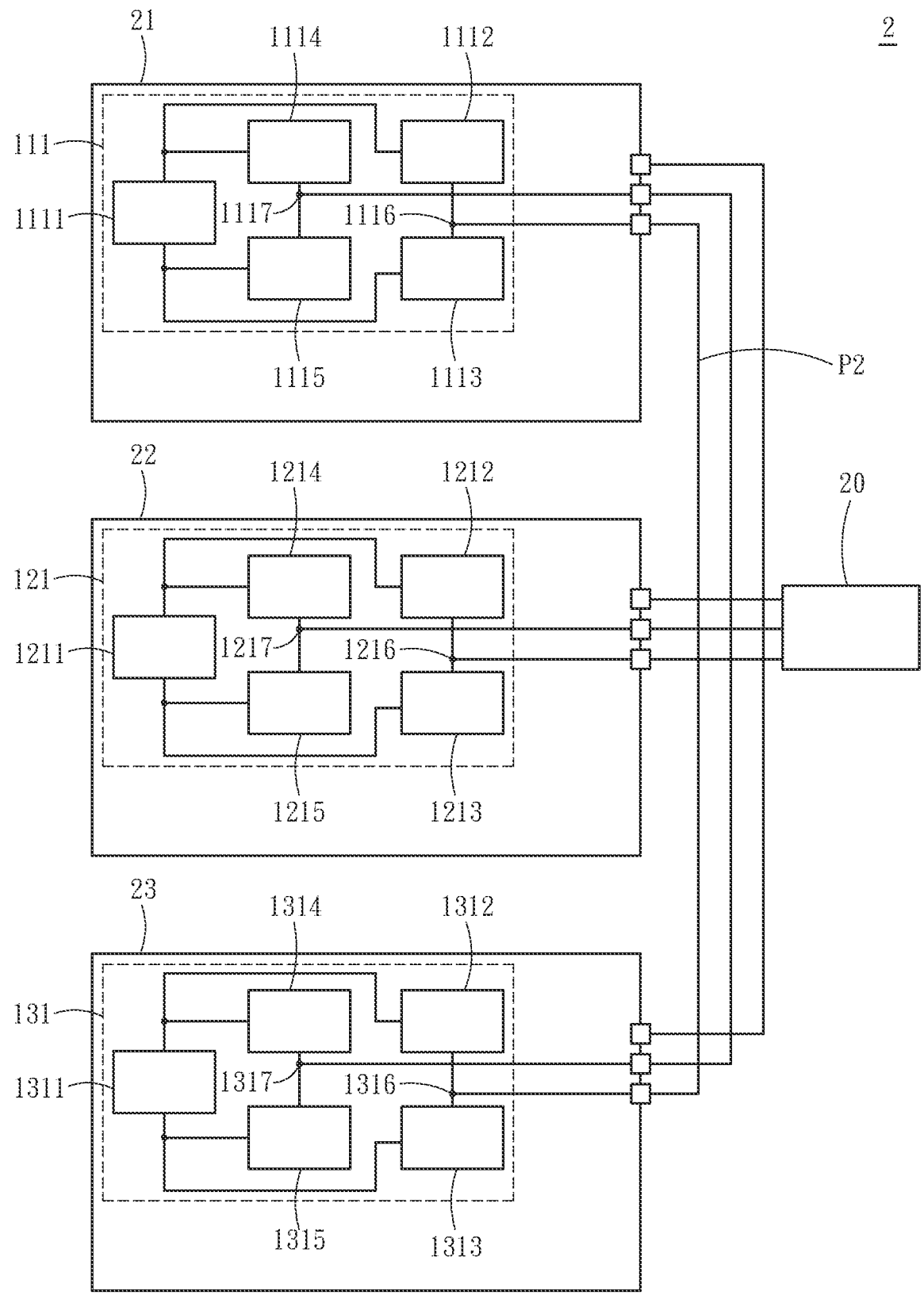
FIG. 3 is a schematic diagram of a multi-phase voltage regulator according to another embodiment of the present disclosure.

FIG. 3 shows a schematic diagram of a multi-phase voltage regulator 2 according to another embodiment of the present disclosure. The multi-phase voltage regulator 2 of the embodiment has a similar function to the multi-phase voltage regulator 1 shown in FIG. 1, and this embodiment differs from the embodiment shown in FIG. 1 in that the multi-phase control circuit includes a single control module rather than a plurality of the control modules.

The multi-phase voltage regulator 2 in FIG. 3 includes a single control unit 20 and a plurality of power stages 21, 22, 23. The control unit 20 includes a pulse width modulation adjustment circuit. In the embodiment, the control unit 20 further includes a power processing circuit. Each of the plurality of power stages 21, 22, 23 lacks of the pulse width modulation adjustment circuits 1131, 1231, 1331 as the multi-phase voltage regulator 1 in FIG. 1.

In this embodiment, each of the plurality of power stages 21, 22, 23 operates at different phases. The plurality of power stages 21, 22, 23 are coupled to the controller 20. The temperature sampling units 111, 121, 131 are arranged in the plurality of power stages 21, 22, 23, respectively and connected in parallel with each other to form a parallel circuit P2.

The pulse width modulation adjustment circuit in the controller 20 acquires a first temperature signal. The first temperature signal reflects a representative temperature among the plurality of power stages 21, 22, 23, i.e. the pulse width modulation adjustment circuit can obtain the representative temperature among the plurality of power stages 21, 22, 23. The pulse width modulation adjustment circuit in the controller 20 acquires a plurality of second temperature signals from the temperature sampling units 111, 121, 131 the plurality of second temperature signals correspond to a respective temperature of each of the plurality of power stages 21, 22, 23.

In this embodiment, the pulse width modulation adjustment circuit in the controller 20 adjusts the pulse width modulation signals W1 of the plurality of power stages 21, 22, 23 according to the comparison results between the first temperature signal and each of the plurality of second temperature signals to balance the temperature among the plurality of power stages 21, 22, 23. The multi-phase voltage regulator 2 can effectively enable the plurality of power stages 21, 22, 23 to achieve temperature equalization, and the reliability of the multi-phase voltage regulator 2 is greatly improved.

Figure 4:
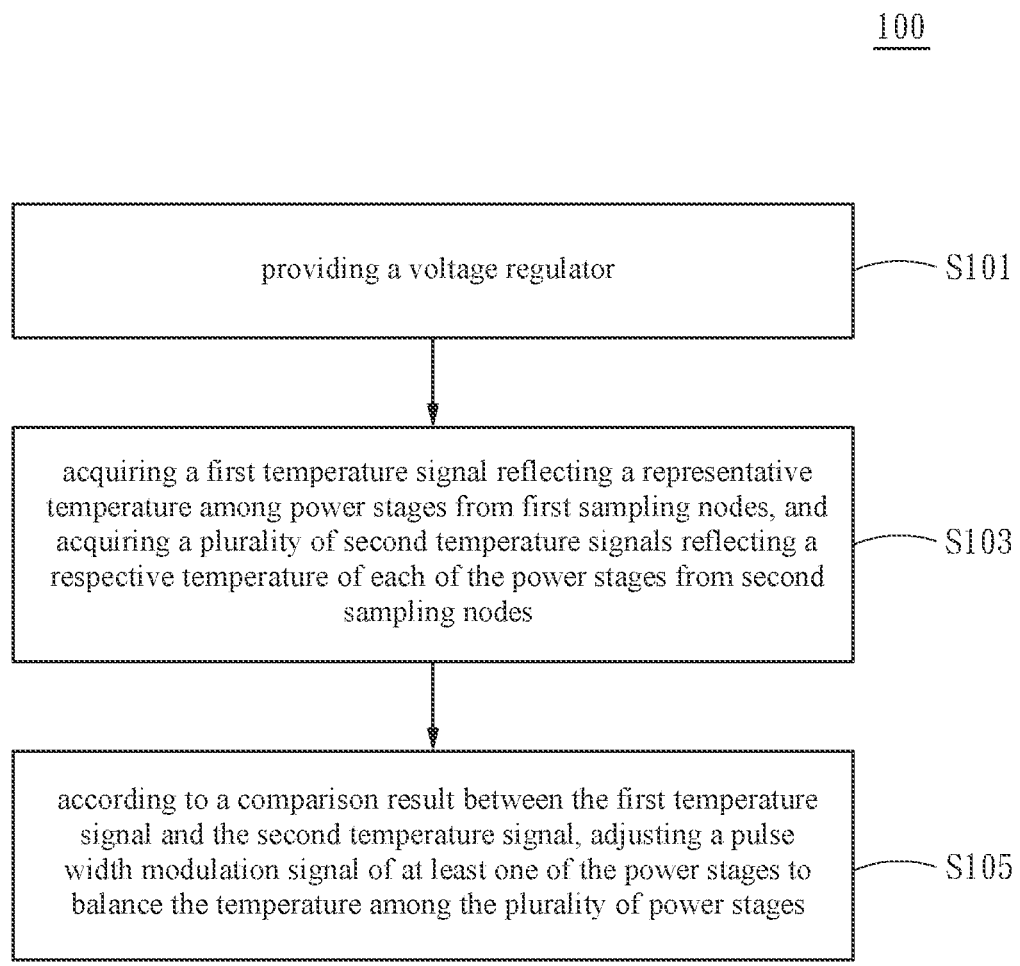
FIG. 4 is a flowchart of a temperature balance control method of a multi-phase voltage regulator according to an embodiment of the present disclosure.

With reference to FIG. 4, a flow diagram of a temperature balance control method 100 of a multi-phase voltage regulator according to an embodiment of the present disclosure is shown. The temperature balance control method 100 may be applied to the multi-phase voltage regulator 1 shown in FIG. 1 or the multi-phase voltage regulator 2 shown in FIG. 3. The temperature balance control method 100 includes the following steps. In step S101, a voltage regulator is provided. Next, in step S103, a first temperature signal reflecting a representative temperature among the plurality of power stages is acquired from the first sampling nodes, and a plurality of second temperature signals reflecting a respective temperature of each of the plurality of power stages are acquired from the second sampling nodes. In step S105, according to a comparison result between the first temperature signal and the second temperature signal, a pulse width modulation signal of at least one of the power stages is adjusted to balance the temperature among the plurality of power stages.

With respect to the various details of the implementation of the steps illustrated in FIG. 4, a detailed description of the various embodiments and implementations set forth above will be omitted in the following context.

In summary, the temperature differences between the plurality of power stages operating in different phases could be easily obtained by comparing the first temperature signal and the second temperature signal. Then, one or some of the pulse width modulation signals for controlling the plurality of power stages may be adjusted individually to compensate the temperature differences between the plurality of power stages. As such, the temperature differences could be minimized and temperature equalization of the multi-phase voltage regulator can be effectively achieved. The reliability of the multi-phase voltage regulator is greatly improved. By utilizing the circuit and method of the present disclosure, the multi-phase voltage regulator can fully utilize the power output capability of the multi-phase power supply and simultaneously improve the reliability of the multi-phase power supply

What is claimed is:

1. A multi-phase control circuit, configured to control a plurality of power stages operating in different phases, comprising:
    a plurality of control modules for controlling the plurality of power stages;
    wherein at least one of the control modules acquires a first temperature signal indicating a representative temperature among the plurality of power stages and a second temperature signal indicating a respective temperature thereof; and
    wherein the at least one of the control modules adjusts a pulse width and/or frequency of a pulse width modulation signal of the power stage according to a comparison result between the first temperature signal and the second temperature signal so as to balance the temperatures of the plurality of power stages.

2. The multi-phase control circuit according to claim 1, wherein an adjustment amplitude of the pulse width and/or frequency of the pulse width modulation signal of the power stage is positively correlated with the comparison result.

3. The multi-phase control circuit according to claim 1, wherein the first temperature signal reflects a highest temperature or a lowest temperature among the plurality of power stages.

4. The multi-phase control circuit according to claim 1, wherein the multi-phase control circuit includes a plurality of temperature sampling units, each of the temperature sampling units comprises a temperature sampling circuit, a first pull-up circuit and a first pull-down circuit, the first pull-up circuit and the first pull-down circuit being respectively coupled to the temperature sampling circuit, a first sampling node being formed between the first pull-up circuit and the first pull-down circuit, the temperature sampling units being connected in parallel with each other through the first sampling nodes, wherein the control module acquires the first temperature signal from the first sampling node.

5. The multi-phase control circuit according to claim 4, wherein the temperature sampling unit further comprises a second pull-up circuit and a second pull-down circuit, the second pull-up circuit and the second pull-down circuit being respectively coupled to the temperature sampling circuit, a second sampling node being formed between the second pull-up circuit and the second pull-down circuit, wherein the control module acquires the second temperature signal from the second sampling node.

6. The multi-phase control circuit according to claim 1, wherein each of the plurality of the control modules comprises a pulse width modulation adjustment circuit for receiving the pulse width modulation signal from a pulse width modulation input, wherein the pulse width modulation adjustment circuit adjusts the pulse width modulation signal and outputs an adjusted pulse width modulation signal according to the comparison result.

7. The multi-phase control circuit according to claim 1, wherein the pulse width modulation signal of each of the plurality of power stages is adjusted according to the comparison result correspondingly of each of the plurality of power stages to keep the temperature of each of the plurality of power stages consistent and close to a predetermined value.

8. A multi-phase control circuit, configured to control a plurality of power stages operating in different phases, comprising:
 a control module for controlling the plurality of power stages;
 wherein the control module acquires a first temperature signal indicating a representative temperature among the plurality of power stages and a plurality of second temperature signals indicating to a plurality of respective temperatures of the plurality of power stages; and
 wherein the control module adjusts a pulse width and/or frequency of a pulse width modulation signal of at least one of the plurality of power stages according to a comparison result between the first temperature signal and at least one of the plurality of second temperature signals so as to balance the temperatures of the plurality of power stages, and an adjustment amplitude of the pulse width and/or frequency of the pulse width modulation signal of the at least one of the plurality of power stages at an operating phase is positively correlated with the comparison result.

9. The multi-phase control circuit according to claim 8, wherein the multi-phase control circuit includes a plurality of temperature sampling units, the temperature sampling unit comprising a temperature sampling circuit, a first pull-up circuit, and a first pull-down circuit, the first pull-up circuit and the first pull-down circuit being respectively coupled to the temperature sampling circuit, a first sampling node being formed between the first pull-up circuit and the first pull-down circuit the temperature sampling units being connected in parallel with each other through the first sampling nodes, wherein the controller acquires the first temperature signal from the first sampling node.

10. The multi-phase control circuit according to claim 9, wherein the temperature sampling unit further comprises a second pull-up circuit and a second pull-down circuit, the second pull-up circuit and the second pull-down circuit being respectively coupled to the temperature sampling circuit, a second sampling node being formed between the second pull-up circuit and the second pull-down circuit, wherein the control module acquires the plurality of second temperature signals from the second sampling node of each of the plurality of power stages.

11. The multi-phase control circuit according to claim 8, wherein the pulse width modulation signal of each of the plurality of power stages is generated according to the comparison result of each of the plurality of power stages to keep the temperature of each of the plurality of power stages consistent and close to a predetermined value.

12. A multi-phase power system, comprising a plurality of power processing circuits and a multi-phase control circuit, wherein the multi-phase control circuit comprises:
 a plurality of control modules for controlling the plurality of power stages;
 wherein at least one of the control modules acquires a first temperature signal indicating a representative temperature among the plurality of power stages and a second temperature signal indicating a respective temperature thereof; and
 wherein the at least one of the control modules adjusts a pulse width and/or frequency of a pulse width modulation signal of the power stage according to a comparison result between the first temperature signal and the second temperature signal so as to balance the temperatures of the plurality of power stages.

13. A temperature balance method of a multi-phase control circuit, comprising the following steps:
 acquiring a first temperature signal indicating a representative temperature among a plurality of power stages;
 acquiring a plurality of second temperature signals indicating a plurality of respective temperatures of each of the plurality of power stages; and
 adjusting a pulse width and/or frequency of a pulse width modulation signal of at least one of the plurality of power stages according to a comparison result between the first temperature signal and at least one of the plurality of second temperature signals so as to balance the temperatures of the plurality of power stages, and an adjustment amplitude of the pulse width and/or frequency of the pulse width modulation signal of the at least one of the plurality of power stages is positively correlated with the comparison result.

14. The method according to claim 13, wherein the first temperature signal reflects a highest temperature or a lowest temperature among the plurality of power stages.

15. The method according to claim 13, wherein the pulse width modulation signal of each of the plurality of power stages is generated according to the comparison result correspondingly of each of the plurality of power stages to keep the temperature of each of the plurality of power stages consistent and close to a predetermined value.

16. The method according to claim 13, wherein the multi-phase control circuit includes at least one control module and a plurality of temperature sampling units, wherein the temperature sampling unit comprises a temperature sampling circuit, a first pull-up circuit and a first pull-down circuit, the first pull-up circuit and the first pull-down circuit being respectively coupled to the temperature sampling circuit, a first sampling node being formed between the first pull-up circuit and the first pull-down circuit, the temperature sampling units being connected in parallel with each other through the first sampling nodes, wherein the first temperature signal is acquired from the first sampling node.

17. The method according to claim 16, wherein the temperature sampling unit further comprises a second pull-up circuit and a second pull-down circuit, the second pull-up circuit and the second pull-down circuit being respectively coupled to the temperature sampling circuit, a second sampling node being formed between the second pull-up circuit and the second pull-down circuit, the temperature sampling units being connected in parallel with each other through the second sampling nodes, wherein each of the plurality of second temperature signals is acquired from the second sampling node.

18. A multi-phase control circuit, configured to control a plurality of power stages operating in different phases, comprising:
- a control module for controlling the plurality of power stages,
- wherein the control module acquires a first temperature signal indicating a representative temperature among the plurality of power stages and a plurality of second temperature signals indicating to a plurality of respective temperatures of the plurality of power stages, the first temperature signal reflects a highest temperature or a lowest temperature among the plurality of power stages, and
- wherein the control module adjusts a pulse width and/or frequency of a pulse width modulation signal of at least one of the plurality of power stages according to a comparison result between the first temperature signal and at least one of the plurality of second temperature signals so as to balance the temperatures of the plurality of power stages.

* * * * *